United States Patent [19]

MacDonald

[11] 4,275,227

[45] Jun. 23, 1981

[54] SYNTHESIS OF WATER SOLUBLE CROSS-LINKERS AND THEIR USE IN THE MANUFACTURE OF ANIONIC POLYMERS

[75] Inventor: Russell J. MacDonald, Woburn, Mass.

[73] Assignee: Ionics Inc., Watertown, Mass.

[21] Appl. No.: 84,337

[22] Filed: Oct. 12, 1979

[51] Int. Cl.³ ............................................ C07C 69/527
[52] U.S. Cl. ..................................... 560/222; 204/301
[58] Field of Search ..................... 560/222; 260/501.13

[56] References Cited

U.S. PATENT DOCUMENTS

| | | | |
|---|---|---|---|
| 2,946,758 | 7/1960 | Zenftman | 560/222 |
| 3,694,393 | 9/1972 | Lewis et al. | 560/222 |
| 3,720,656 | 3/1973 | Manaka | 560/222 |

*Primary Examiner*—Robert Gerstl
*Assistant Examiner*—L. Hendriksen
*Attorney, Agent, or Firm*—Norman E. Saliba

[57] ABSTRACT

The reaction of glycidyl methacrylate (GMA) with an ionogenic methacrylate ester containing amine groups of the tertiary type such as dimethylaminoethyl methacrylate (DMAEMA) in the presence of an acidic water solution produces a new and novel water soluble, ionic, cross-linking, methacrylate bifunctional monomer which is useful in the manufacture of anion exchange polymers while employing an aqueous solvent system.

2 Claims, No Drawings

SYNTHESIS OF WATER SOLUBLE CROSS-LINKERS AND THEIR USE IN THE MANUFACTURE OF ANIONIC POLYMERS

BACKGROUND OF THE INVENTION

1. Field of the Invention

This invention is directed to novel water soluble, methacrylic ester, quaternary ammonium, cross-linking monomers and to their synthesis; and in particular to the use of the same in the manufacture of novel anion exchange resins or polymers using an aqueous solvent system.

2. Description of the Prior Art

The usual technique for the production of ion-exchange polymers involves polymerizing a non-ionic, non-water soluble, cross-linking agent, as for example, divinyl benzene with a monomer such as vinylbenzyl chloride in a non-aqueous solvent such as diethylbenzene. The resulting solid polymer, for example, in sheet or membrane form is equilibrated or washed several times with a water soluble solvent such as methanol so as to remove and replace the diethylbenzene solvent which is hydrophobic. Where anion exchanges are desired the membranes are then reacted with an aqueous solution of an amine such as trimethylamine to form quaternary ammonium chloride groups which gives the polymer its strongly basic ion-exchange properties. The prior art has disadvantages in that the cross-linking agent is non-ionic thus producing polymers having low ion-exchange capacity. Further, the monomers employed are water insoluble and the polymerizaton reaction is carried out in a non-aqueous solvent system. This requires replacing the petroleum-derived solvents in the polymer with an aqueous solvent; thus necessitating a disposal problem with loss of the organic solvents.

The present invention comprises an improvement over the methods of the prior art by providing water soluble monomers polymerized in an aqueous solvent system employing an ionically active, cross-linking agent. Thus ion-exchange polymeric membranes are prepared having high ion-exchange capacities and low electrical resistance. Additionally the polymerization step requires shorter time periods and lower curing temperature for a net saving in energy. Also the expense of petroleum derived solvents and the problem of their disposal is eliminated.

SUMMARY OF THE INVENTION

The invention comprises the reaction product of a mixture of glycidyl methacrylate (GMA), dimethylaminoethyl methacrylate (DMAEMA) and a water solution of an acid.

GMA is a clear, colorless, functional methacrylate ester monomer containing a vinyl grouping and is soluble in most organic solvents but not in water. The invention broadly contemplates the use of glycidyl esters of acrylic, methacrylic and crotonic acids although the methacrylic ester GMA, is preferred.

DMAEMA is an ionogenic methacrylate ester containing a vinyl and a tertiary amine grouping. It is a relatively non-volatile, clear liquid which is very soluble in water and in common organic solvents. Other ethenoid monomers containing acrylic or methacrylic groups dimethylaminopropyl acrylamide, diethylaminoethyl methacrylate and dimethylaminoethyl acrylate is also contemplated by the present invention with DMAEMA being the more highly preferred. The product of the reaction is a homogeneous, water soluble, ionic, cross-linking monomer (WSXL). This reaction has been found to absolutely require the use of an aqueous acid which was an unexpected discovery, otherwise the product so formed is a gel and not water soluble. The halide acids are the preferred acids with HCl being the most preferred.

The water soluble cross-linking monomer may be synthesized using a wide ratio range of GMA to DMAEMA, but for the purpose of employing the resulting cross-linking monomer for the later manufacture of anion-exchange polymers, it is preferred that the GMA comprise about 35% to 45% by weight of the resulting cross-linking monomer.

The invention further comprises the use of the cross-linking monomer in the manufacture of anion exchange polymers especially in sheet or membrane form for use in electrodialysis apparatus employed in the process of changing the ionic content of liquids. In the process of manufacturing anion exchange polymers, the water soluble, cross-linking monomer (WSXL) containing for example quaternary ammonium chloride groups is homo-polymerized by the use of increased temperatures. In the alternate, the WSXL monomer and a polymerization initiator is mixed with a functional monomer such as DMAEMA and heated until polymerized into a solid anion polymer. The resulting polymer will now contain pendant amine groups of the tertiary type in addition to the quaternary ammonium groups provided by the WSXL monomer. The ion-exchange capacity of the polymer may then be increased by reacting the weak base tertiary amine groups with an alkaylating reagent such as methyl chloride to form strong base quaternary ammonium chloride groups.

A suitable class of free-radical generating compounds which can be used as catalysts for polymerization are both the peroxides and the azo catalysts. The azo catalyst include for example, 2,2′-azobis (2-amidinopropane)hydrochloride, azobisisobutyronitrile, azobisisobutyramide, azobis ($\alpha$, $\alpha$,-dimethylvaleronitrile), azobis ($\alpha$-methyl-butyronitrile), dimethyl, diethyl, or dibutyl azobis (methyl-valerate). The peroxide catalyst include benzoyl peroxide, hydrogen peroxide potassium persulfate and the like. These compounds, which serve as free radical initiators, contain an —N=N— group (azo) or —O—O— group (peroxide) attached to aliphatic carbon atoms, at least one of which is tertiary. An amount of 0.01% to 2% of the weight of monomer or monomers is usually sufficient.

The polymerization reaction may be carried out in the temperature range of about 40° C. to 100° C. but the preferred range is between about 60° C. to 80° C.

The preferred procedure for preparing the monomers, homopolymers and copolymers of this invention is further illustrated by the following examples:

EXAMPLE I

A solution of HCl was prepared by dissolving 183 gms. of conc. HCl into 1346 gms. of water. The acid solution was allowed to cool to room temperature. To this HCl solution was added 765 gms. of the monomer dimethylaminoethyl methacrylate (DMAEMA) having the structural formula:

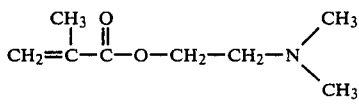

and 710 gms. of the polyfunctional monomer glycidyl methacrylate (GMA) having the formula:

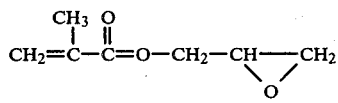

After stirring (for about 2 hours at 40°–50° C.) the mixture was allowed to stand at room temperature. The resulting homogeneous, clear, colorless, solution of a water soluble, ionic, cross-linking bifunctional monomer (WSXL) containing two ($CH_2=C<$) vinyl groups resulted in accordance with the following reaction:
GMA + DMAEMA + HCl → WSXL

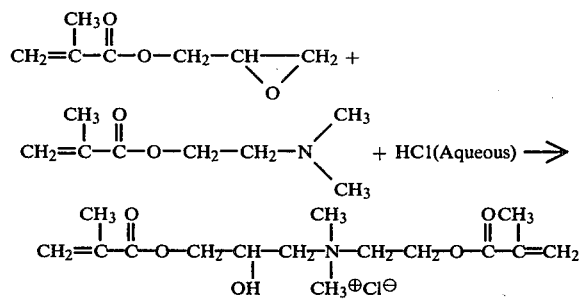

To this resulting cross-linking monomer was added 33 gms. of water soluble polymerization initiator 2,2′-azobis (2-amidinopropane) hydrochloride which is obtainable from Crescent Chemical co., of Hauppauge, NY under the trade name V-50. The water soluble, cross-linking (WSXL) monomer containing quaternary ammonium chloride groups was then poured into an 11″×13″×2″ deep rectangular tray into which was laid in alternating fashion, glass plates and 20 mil thick modacrylic cloth until the top of the monomer liquid level was reached. The entire tray was put into an oven at 80° C. and heated for 2 hours. At the end of this period, the monomer had turned to a solid mass. The excess resin was chipped from the pan and the glass was removed to yield cloth sheets, 20 mils in thickness surrounded and impregnated with polymerized resin. The resulting membranes gave the following properties:
Mullen Burst = 140 psi
Thickness = 0.054 cm
Resistivity = 11.3 ohm-cm$^2$ (0.01 N NaCl) (1000 Hz)
Water Content = 49.3%
Capacity = 2.33 Milliequivalents Cl$^\ominus$ per gram of dry resin

EXAMPLE 2

The solution of WSXL and the azo initiator prepared as in Example 1 was mixed with 765 gms. of DMAEMA and polymerized into membrane sheets using the method of Example 1. The novel anion exchange polymers which resulted from the polymerization now contain a mixture of tertiary amine and quaternary ammonium chloride groups and comprise a plurality of units of the following basic formulae:

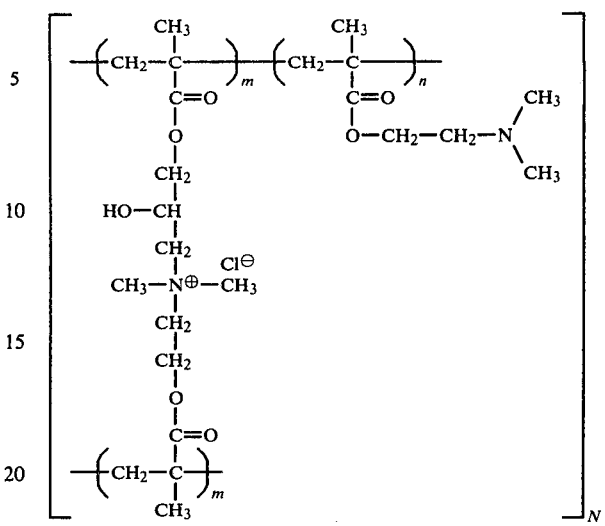

Mullen Burst = 137 psi
Thickness = 0.052 cm
Resistivity = 15.5 ohm-cm$^2$
Water Content = 49.7%
Capacity = 1.80 Milliequivalents Cl$^\ominus$

EXAMPLE 3

Membranes prepared as in Example 2 were further reacted for 17 hours at room temperature in a bath of methyl alcohol (CH$_3$OH) saturated with methyl chloride (CH$_3$Cl). The bath was contained in a closed vessel to prevent the gaseous methyl chloride from escaping from the alcohol during the reaction period. This methylation reaction increases the ion-exchange capacity of the polymer by forming additional ammonium chloride groups as follows:

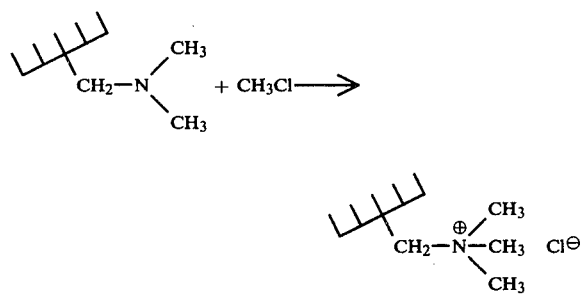

In the above equation the symbol ↭ represents the base polymer.

The membranes so treated were washed in water and their properties determined as follows:
Mullen Burst = 137 psi
Thickness = 0.052 cm
Resistivity = 11.5 ohm-cm$^2$
Water Content = 49.7%
Capacity = 2.31 Milliequivalents Cl$^\ominus$

EXAMPLE 4

A solution prepared as in Example 1 was mixed with 1390 gms. of Sipomer ® Q-6-75, a catonic methacrylate monomer, obtainable from Alcolac, Inc., Baltimore, Maryland. Sipomer Q-6-75 is a 73–77% aqueous solution of the quaternization product of DMAEMA and methyl chloride having the formula $CH_2=C(CH_3)COO(CH_2)N^{\oplus}(CH_3)_3Cl^{\ominus}$. The resulting liquid mixture was then polymerized into anion exchange membranes as in Example 1. The membranes had the following properties:

Mullen Burst = 135 psi

Thickness = 0.063 cm

Resistivity = 10.0 ohm-cm$^2$

Water Content = 51.7%

Capacity = 2.64 Milliequivalents Cl$^{\ominus}$

The use of the quaternary ammonium salt of DMAEMA and methyl chloride allows the direct one step manufacture of anion membranes having substantially all quaternary ammonium groups without the need to employ the additional methylation reaction step as described in Example 3.

EXAMPLE 5

To a solution of 354 gms. of glacial acetic acid in 2120 gms. of water was added 930 gms. of the monomer DMAEMA and 840 gms. of the polyfunctional monomer GMA. After stirring for about two hours at 40°–50° C., a homogeneous, clear, colorless solution of a water soluble, ionic, cross-linking bifunctional monomer formed having the following formula:

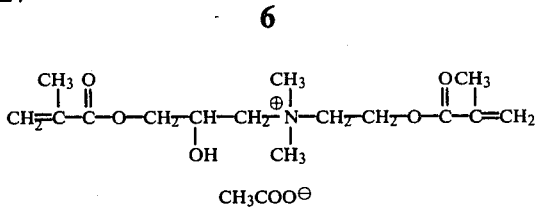

$CH_3COO^{\ominus}$

To this mixture was added 42 gms. of V-50 initiator and polymerized into membrane sheets using the method of Example 1.

The resulting membranes gave the following properties:

Mullen Burst = 130 psi

Thickness = 0.056 cm

Resistivity = 8.6 ohm-cm$^2$

Water Content = 52.1%

Capacity = 2.31 Milliequivalents Cl$^{\ominus}$

As many apparently widely different embodiments of this invention may be made without departing from the spirit and scope thereof, it is to be understood that the invention is not limited to the specific embodiments thereof except as defined in the appended claims.

The embodiments of this invention in which an exclusive property or privilege is claimed are defined as follows:

1. A water soluble, ionic, cross-linking bifunctional monomer of the formula:

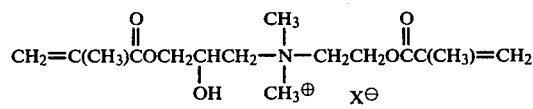

where X represents a univalent anion of an acid.

2. The structure according to claim 1 wherein X is selected from the group consisting of Cl$^-$, Br$^-$, I$^-$, HSO$_4^-$, NO$_3^-$, (SO$_4^{--}$)$_½$, RCOO$^-$, where R represents an alkyl group from C$_1$–C$_6$.

* * * * *